United States Patent

Kimura et al.

[11] Patent Number: 5,914,475
[45] Date of Patent: Jun. 22, 1999

[54] PHOTOGRAPHIC FILM AND METHOD OF TESTING THE PHOTOGRAPHIC FILM AND APPARATUS THEREOF

[75] Inventors: Tsutomu Kimura; Junji Sugano, both of Kanagawa, Japan

[73] Assignee: Fuji Photo Film Co., Ltd., Kanagawa, Japan

[21] Appl. No.: 08/712,622

[22] Filed: Sep. 11, 1996

[30] Foreign Application Priority Data

Sep. 12, 1995 [JP] Japan .................................... 7-234063

[51] Int. Cl.⁶ ...................................................... G06K 7/10
[52] U.S. Cl. ................ 235/462.01; 235/432; 235/472.01
[58] Field of Search ..................... 235/462, 454, 235/375, 472

[56] References Cited

U.S. PATENT DOCUMENTS 5,122,645  6/1992  Saeki et al. .............................. 235/462
5,128,519  7/1992  Tokuda ..................................... 235/462
5,164,574  11/1992  Ujiie et al. .............................. 235/462
5,268,563  12/1993  Takenaka ................................. 235/462

*Primary Examiner*—Thien Minh Le
*Attorney, Agent, or Firm*—Sughrue, Mion, Zinn, Macpeak & Seas, PLLC

[57] ABSTRACT

ID number is written in machine readable format which can be read by an apparatus and in man readable format which can be read by an operator to specify a photographic film. When ID number in machine readable format is read in error, ID number is represented in man readable format, and when ID number is input by an inputting device, the photographic film is specified by the input ID number, so that a predetermined testing process is effected.

8 Claims, 12 Drawing Sheets

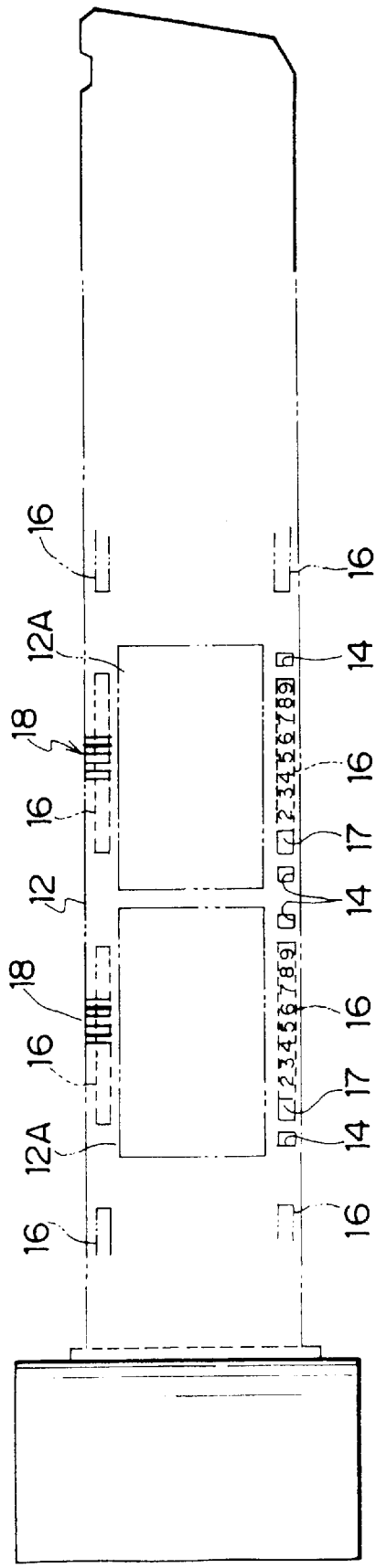

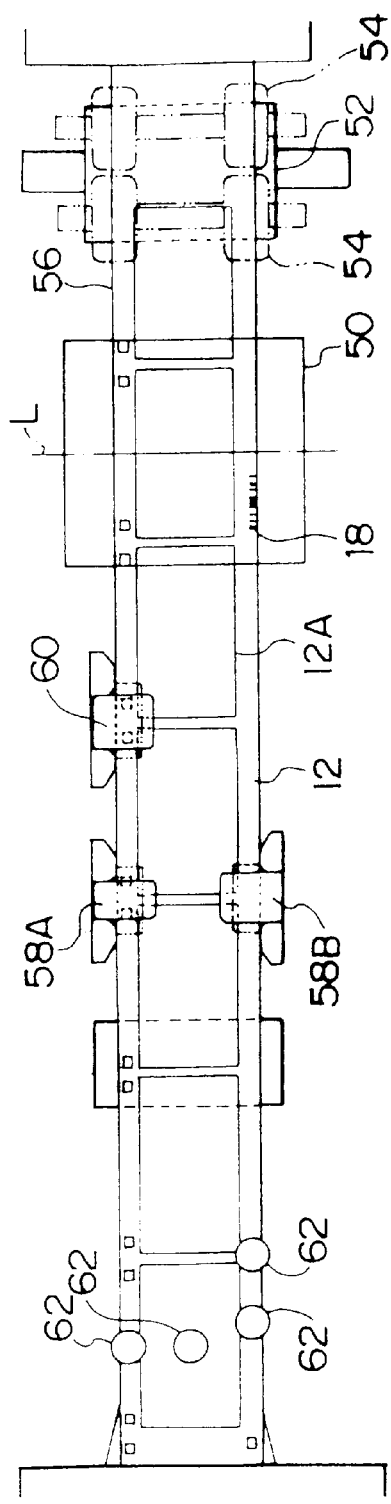
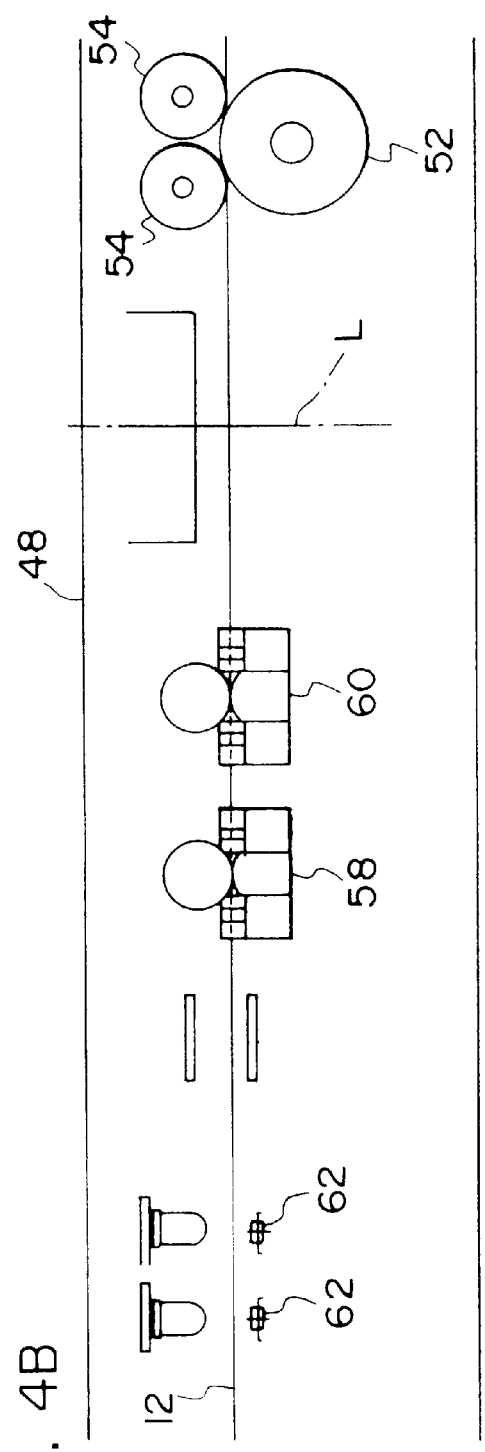
FIG. 4A
FIG. 4B

FIG.10A

| MANAGEMENT AREA | |
|---|---|
| FID NUMBER | |
| FRAME NUMBER 1 | TEST INFORMATION 1 |
| FRAME NUMBER 2 | TEST INFORMATION 2 |
| ⋮ | ⋮ |
| FRAME NUMBER 24 | TEST INFORMATION 24 |

FIG.10B

| MANAGEMENT AREA | |
|---|---|
| FID NUMBER | |
| NUMBER OF TESTED FRAMES | |
| FRAME NUMBER 3 | TEST INFORMATION 3 |
| FRAME NUMBER 8 | TEST INFORMATION 8 |
| ⋮ | ⋮ |
| FRAME NUMBER 23 | TEST INFORMATION 23 |

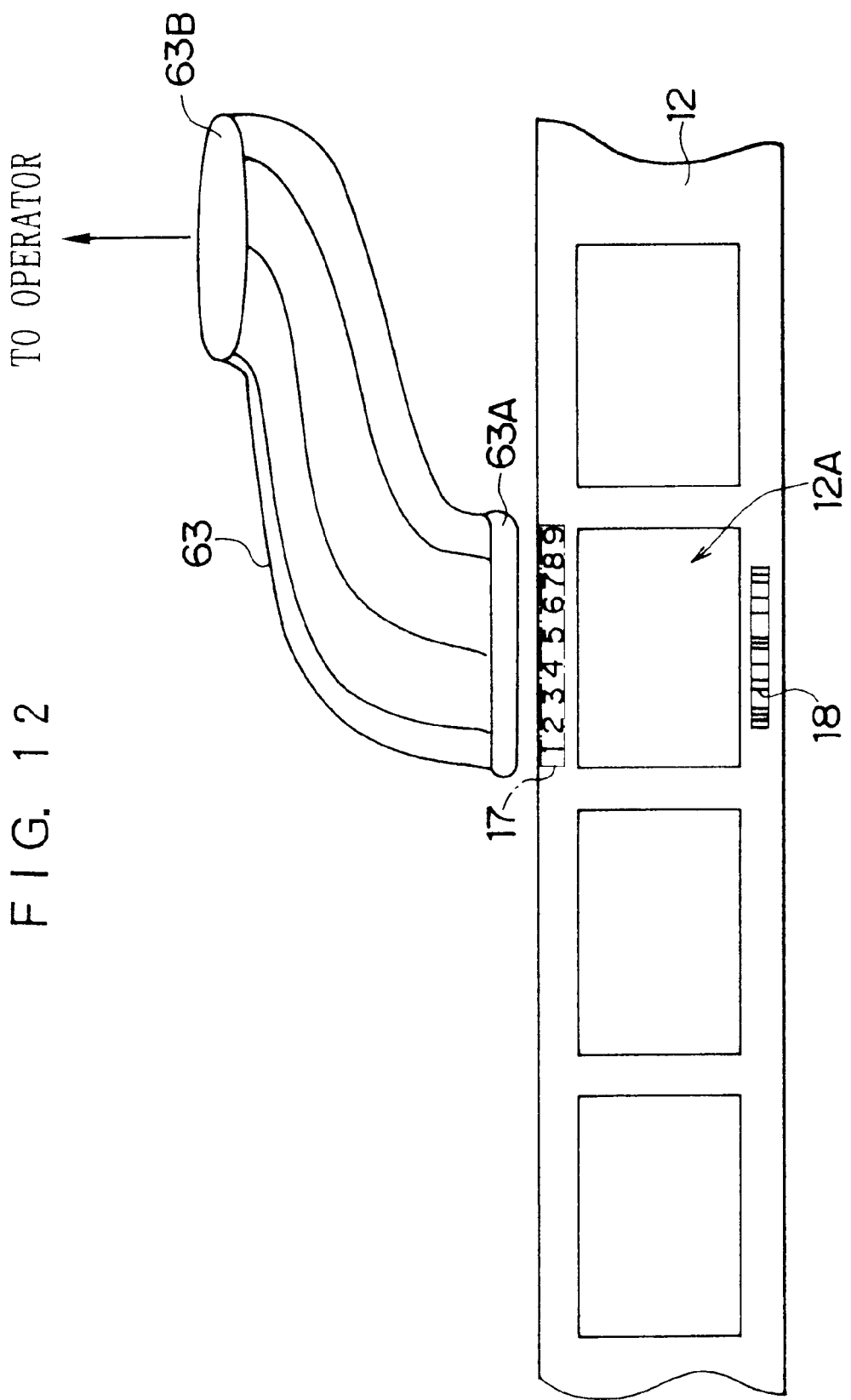

PHOTOGRAPHIC FILM AND METHOD OF TESTING THE PHOTOGRAPHIC FILM AND APPARATUS THEREOF

BACKGROUND OF THE INVENTION

1. Field of the Invention

The present invention relates to a photographic film into which ID number is written in machine readable format and operator (or man) readable format to distinguish the photographic film from others, a method of specifying the photographic film in which even when ID number is read in error, the photographic film is specified effectively because ID number is represented in operator readable format, and a method of testing the photographic film and an apparatus thereof in which testing operation for the photographic film is more facilitated by the method of specifying the photographic film.

2. Description of the Related Art

Generally, a testing apparatus for a negative film is constituted such that image frames in a negative film which have been read by a scanner are displayed for each of the frames, a testing operation for the negative film is effected as an operator views the displayed image, so that a determination is made whether the image printed on a photographic printing paper by a printer processor is proper, or whether exposure correction is needed for the image.

However, in the above-described testing operation, when a large number of negative films are handled, a great deal of time and labor have been consumed in order to sort information about which image frame in which negative film is improper for printing and about whether exposure correction is needed for the image frame or the like and then to use the sorted information at a printing process using the printer processor.

Therefore, in prior art, because a DX code or a bar code representing a frame number which is written into the negative film is automatically read by a negative film testing apparatus, information about the negative film is sorted, and the operator's labor can be reduced, accordingly.

However, since no information has been given which distinguishes a negative film from others in the aforementioned prior art, the operator has had to identify individual negative films by his own judging ability, so that the operator's labor has not been reduced largely.

SUMMARY OF THE INVENTION

In view of the aforementioned facts, an object of the present invention is to provide a photographic film into which ID number is written both in machine readable format and operator readable format to specify the photographic film, and a method of specifying the photographic film, a method of testing the photographic film and an apparatus thereof in which because ID number which has been written into the photographic film can be read automatically and which can be input by an operator even when the ID number is read in error, further process such as testing operation or the like for the photographic film is greatly facilitated.

The first aspect of the present invention is a photographic film in which ID number for distinguishing a film from others is written on a tip end portion, or on each image frame, or on each cutting unit at the time of development of the photographic film both in man readable format which can be recognized by an operator and machine readable format which can be recognized by a machine.

Thus, ID number in machine readable format is represented by, for example, a bar code or the like. ID number in man readable format is represented by, for example, a numeral. ID number represented in these formats is preferably written into the vicinity of the outer side portion of each image frame. However, it may be written into a tip end portion of the photographic film. Further, when the developed film is cut to the length of several frames and accommodated into a film cover sheet, ID number in these formats may be written for each cut unit of the number of frames, for example, for each 6-image frame.

By using the photographic film according to the first aspect, the apparatus can read ID number in machine readable format and specify the photographic film automatically, so that labor which is needed to effect a process or the like which a large number of the photographic films are handled can be reduced largely. Further, in a case in which ID number in machine readable format cannot be read, ID number in man readable format can be read and input by the operator, so that the photographic film can be specified easily.

The second aspect of the present invention is a method of specifying a photographic film which specifies above described photographic film based on the ID number by reading ID number in the machine readable format which has been written into the photographic film according to the first aspect, wherein when ID number which has been written in the machine readable format cannot be read, ID number which has been written in the man readable format is represented, when ID number is input to the inputting device to which the ID number can be input, the input ID number is used as ID number for the photographic film to specify the photographic film.

Because the photographic film is specified as described above, the operator's labor can be reduced largely, even when the information is sorted in a process in which a large number of the photographic films are handled. Further, even when ID number in machine readable format cannot be read, ID number in man readable format can be read and input by the operator, so that the photographic film can be specified easily. This invention is applicable to a method in which a process for a photographic film is effected by specifying the photographic film, that is to say, a method in which information such as whether the exposure correction amount for the photographic film or whether the printing for an image is proper, or the like is stored into database and sorted.

The third aspect of the present invention is a method of testing a photographic film in which the photographic film is tested by photographing image frames of the photographic film according to the first aspect and by displaying the respective image frames, wherein ID number in the machine readable format is read and when the ID number in the machine readable format is read, the photographic film is specified based on the ID number; when ID number which has been written in the machine readable format cannot be read, ID number which has been written in the man readable format is represented; and if ID number is input in an inputting device to which ID number can be input, the photographic film is specified based on the input ID number, so that the photographic film which has been specified by the ID number is tested.

At this point, the method of testing the photographic film according to the third aspect of the present invention is structured such that an operator tests whether a printing process is appropriate to the photographic film and whether exposure correction is necessary for the photographic film by photographing and displaying the image frames of the photographic film. When the present invention is applied to the testing operation described above, ID number specifies the photographic film and distinguishes the photographic film from others automatically. For example, in a case in which testing results are stored into a database for each of the photographic films, the database facilitates a printing process which prints an image frame on a photographic printing paper. Further, when ID number cannot be read, ID number is displayed. Therefore, an operator who viewed the displayed ID number can input the ID number through an inputting device, and a delay which has been caused to the testing operation by a failure in reading the ID number can be prevented quickly.

The forth aspect of the present invention is an apparatus of testing a photographic film, comprising: photographing means which photographs a predetermined range of an image of the photographic film according to the first aspect, image displaying means which displays the image which has been photographed by the photographing means, transporting means which transports the photographic film to a predetermined position, reading means which reads ID number in the machine readable format which has been written into the photographic film, inputting means to which the ID number can be input, and control means in which when ID number in the machine readable format cannot be read by the reading means, the photographic film is transported by the transporting means so that ID number in the man readable format is incorporated into the predetermined range of the image of the photographic film, ID number in the man readable format is photographed by the photographing means and is displayed by the image displaying means, ID number which is input by the inputting means is used as ID number of the photographic film to specify the photographic film, and a predetermined control is effected to test the specified photographic film.

In accordance with the forth aspect of the present invention, photographing means such as CCD or the like which originally photographs an image frame is used as means for reading ID number in man readable format. Accordingly, control means controls the photographic film in such a manner that when ID number in machine readable format is read in error, ID number in man readable format is transported by transporting means which transports the photographic film to position the ID number in man readable format within a predetermined range which can be read by the photographing means. Moreover, printing process can be even more facilitated by providing storage means such as an optical magnetic disk device or the like, by storing testing results of the photographic film into a database for each of the specified photographic films, and by making the database be accessible by a printer processor or the like which effects printing process.

The fifth aspect of the present invention is an apparatus of testing a photographic film, comprising: photographing means which photographs a predetermined range of the image of the photographic film according to the first aspect; image displaying means which displays the images which have been photographed by the photographing means, transporting means which transports the photographic film to a predetermined position; reading means which reads ID number in the machine readable format which has been written into the photographic film; inputting means to which the ID number can be input, ID number displaying means which optically guides a projected image of ID number in the man readable format and displays at a predetermined position; and control means in which the photographic film is specified by using ID number which is input by the inputting means as ID number of the photographic film when ID number cannot be read by the reading means and a predetermined control is effected to test the specified photographic film.

In accordance with the fifth aspect of the present invention, ID number displaying means optically guides a projected image of ID number in man readable format and displays at a predetermined position where ID number is visible to an operator. When ID number is not read by the reading means, the operator can view the displayed ID number by the ID number displaying means, identify the ID number, and input ID number through inputting means. The control means specifies the photographic film by using ID number which is input by the inputting means as ID number of the photographic film, and effects a predetermined control to test the specified photographic film. Namely, in accordance with the fifth aspect, the ID number displaying means which displays ID number in man readable format is provided independently of the photographing means. The ID number displaying means may consist of, for example, an optical fiber system or a mirror optical system.

BRIEF DESCRIPTION OF THE DRAWINGS

FIG. 3 is a partial plan view of a negative film which is applicable to the present invention;

FIG. 4A is a plan view which illustrates the surrounding portion of a transport path of a negative film carrier;

FIG. 4B is a cross-sectional view which illustrates the surrounding portions of the transport path of the negative film carrier;

FIG. 10A is a view which illustrates a first example of data format of FID number and testing information which are stored into database;

FIG. 10B is a view which illustrates a second example of the data format;

FIG. 12 is a view which illustrates the appearance of an optical reading apparatus which directly reads FID number in man readable format.

DESCRIPTION OF THE PREFERRED EMBODIMENT

A description of a scanner according to an embodiment of the present invention which is employed as a negative film testing apparatus will be given in detail with reference to the accompanying drawings, hereinafter.

Figure 1:
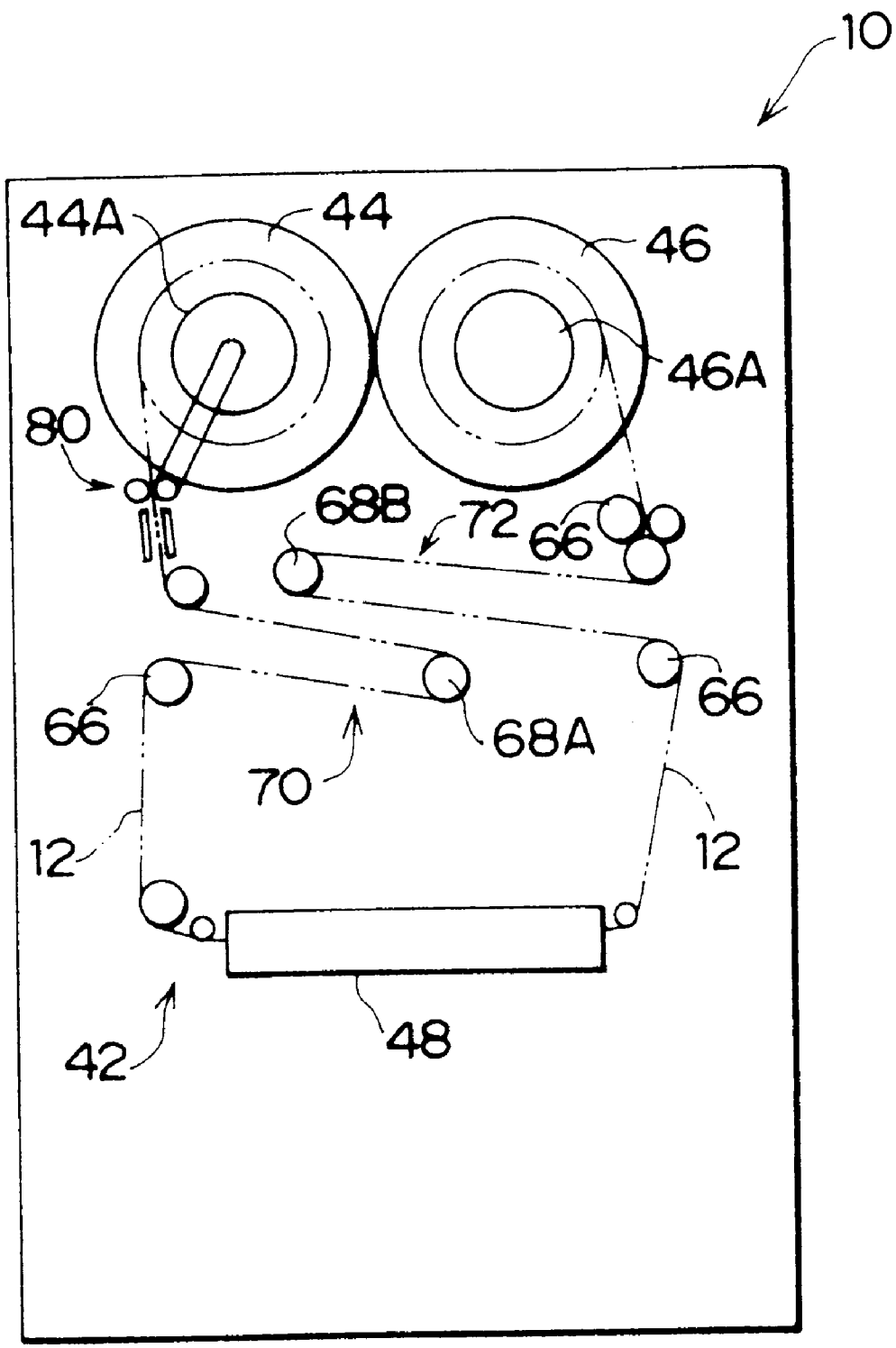
FIG. 1 is a schematic overall view which illustrates a scanner according to an embodiment of the present invention.
Figure 2:
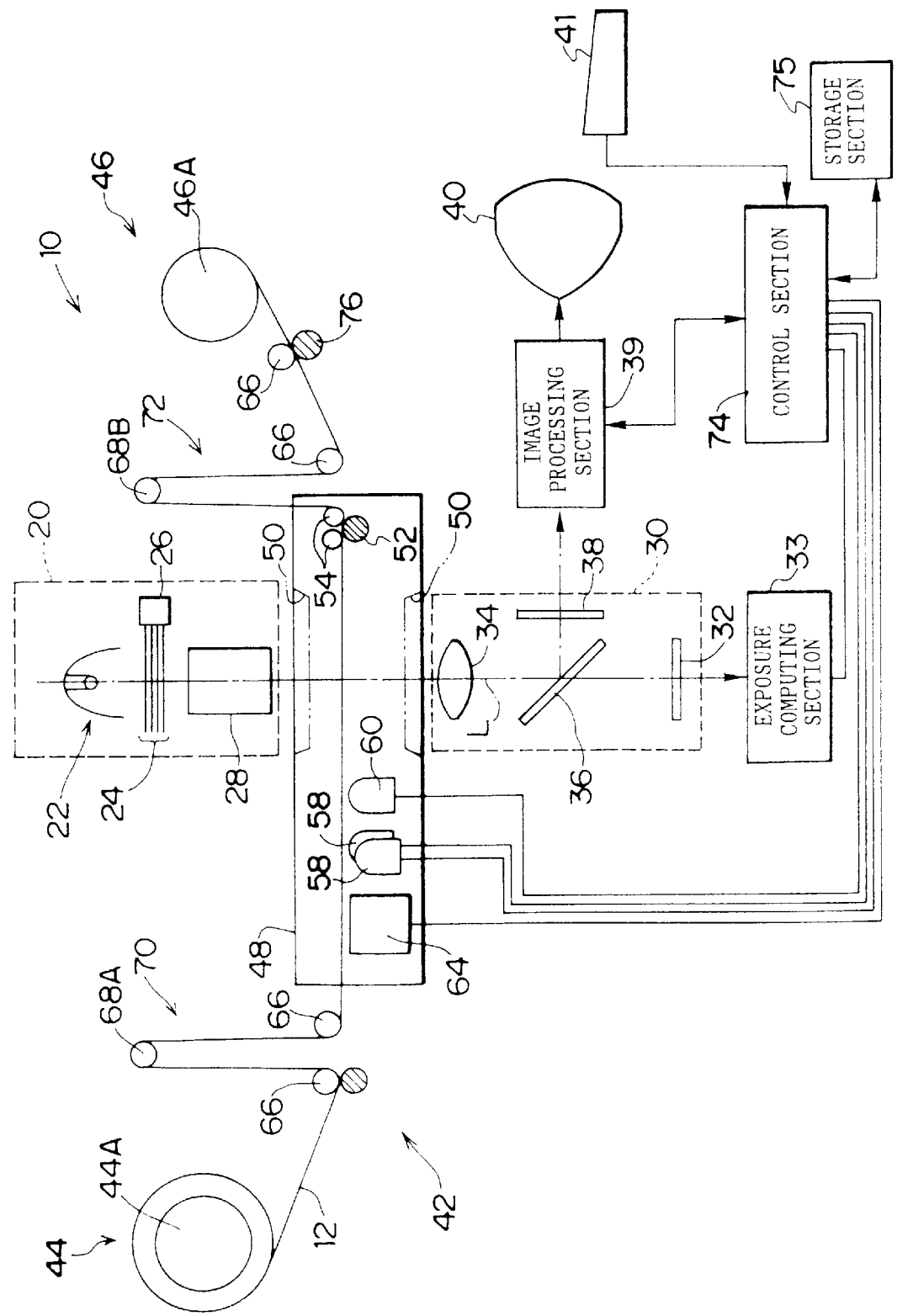
FIG. 2 is a schematic block diagram which illustrates the scanner according to the embodiment of the present invention.

FIG. 1 is a schematic block diagram which primarily illustrates a transport section in a scanner to which the present invention is applicable, and FIG. 2 illustrates a block diagram which illustrates the scanner.

As shown in FIG. 2, a scanner 10 has a light source section 20 exclusively for photometry, a sensor portion 30 which reads and analyzes the image information about an image which is written into a negative film 12, and a transport section 42 which transports the negative film 12. The negative film 12 which has been taken up around a shaft 44A in layers is loaded onto a feeding reel 44 which is provided on the left in FIG. 2 (i.e., on the upper left in FIG. 1). The negative film 12 is transported in the transport section 42, passes through a negative film carrier 48 which is provided halfway of the transport section 42, and is taken up around a shaft 46A of a take-up reel 46 in layers, provided on the right in FIG. 2 (i.e., on the upper right in FIG. 1).

As shown in FIG. 3, the negative film 12 which can be applied to the scanner 10 is provided with a large number of image frames 12A into which respective images are written at a predetermined distance in the longitudinal direction of the film 12. Perforations 14 are formed to be corresponded to each of the positions of the respective image frames 12A in the transverse direction of the film 12, so that sides of a negative film 12 and a position of an image frame 12A can be judged.

Magnetic tracks 16 are provided adjacent to the image frame 12A between each of the perforations 14.

The magnetic track 16 is formed on the reverse side of the negative film 12 which will be disposed outside of the negative film 12 when the film 12 is taken up around a shaft. Various information such as image information at the time of photographing of the image which has been written into each of the image frames 12A, print size when the printing process is effected, and exposure condition or the like are written into the magnetic track 16. Further, the information at the time of photographing of the image which is taken mainly by a photographing apparatus such as a camera or the like is written into the other magnetic track 16 which is provided at the opposite end portion of the negative film 12 to the end portion having the perforations in the transverse direction thereof the film 12.

Moreover, a bar code 18 in which ID number for distinguishing the negative film 12 from others (hereinafter, referred to "FID number") is represented in a format which can be read by the scanner 10 (hereinafter, referred to as "machine readable format") is written into an outside portion of the image frame 12A which corresponds to the end portion of the negative film 12 opposing to the other end portion of the film 12 having the perforations 14 which are formed therein, so that a negative film 12 can be specified. Meanwhile, numeral 17 in which FID number is represented in a format which can be read by an operator (hereinafter, referred to as "man readable format") is written into an outside portion of the image frame 12A which corresponds to the end portion of the end portion of the negative film 12 opposing to a position in which the bar code 18 has been written.

As described above, in accordance with the present embodiment, FID number in machine readable format has been represented as a bar code. However, the present embodiment is not limited to this example using the bar code. A plurality of mechanically formed holes in the negative film 12 may be used to represent FID number depending on the arrangements thereof. Further, in accordance with the present embodiment, FID number in man readable format has been represented as numeral 17. However, the present embodiment is not limited to this example using numeral 17. For example, Chinese characters may be used if they can be recognized by the operator. In addition, positions into which these FID number are written can be modified optionally and preferably.

A light source section 20 is provided in the scanner 10 and is used exclusively for photometry. The light source section 20 comprises a light source 22 having a halogen lamp and a reflector, a filtering section 24 which has three cut filters, C(cyan), M(magenta) and Y(yellow) and a ND filter which is used for adjusting the amount of light, and a light diffusing tube 28 which is disposed under the filtering section 24. Each of the filters in the filtering section 24 is supposed to be inserted into and withdrawn from an optical path L in response to a signal from a driver 26.

A negative film carrier 48, which will be described later, is disposed under the filtering section 24 in FIG. 2. The negative film carrier 48 positions the elongated negative film 12 which is disposed at a predetermined position therein and nips the film 12 by using a transporting roller 52 and a pressing roller pair 54. The transporting roller 52 effects an intermittent transport when the film 12 is transported from the feeding reel 44 to the take-up reel 46 in a forwarding direction thereof, while the transporting roller 52 is transported at a constant rate when the film 12 is transported from the take-up reel 46 to the feeding reel 44 in a returning direction thereof.

Further, a sensor section 30 is provided on the optical path L under the negative film carrier 48 in FIG. 2 and detects the light which has transmitted the negative film 12. As will be described later, the negative film carrier 48 has an opening 50 through which the light which has transmitted the negative film 12 passes, so that the light irradiated from the light source section 20 is incident upon the sensor section 30 without being blocked by the negative film carrier 48.

The sensor section 30 comprises a lens 34 which enlarges and projects an image on the negative film 12, a half mirror 36 which reflects a part of the light which has transmitted the negative film 12 and transmits the other part of the light, a video sensor 38 which photographs the image on the negative film 12, and an exposure computing sensor 32 which measures the intensity of the light in the image.

The lens 34 is structured such that the optical axis thereof is disposed to correspond to the optical path L and the lens 34 is movable along the optical path L, so that an enlargement magnification can be changed. Further, the maximum field angle of the lens 34 is set such that the whole range of the image frame 12A of the negative film 12 including numeral 17 can be enlarged and projected.

A half mirror 36 is disposed under the lens 34 to be inclined substantially 45° with respect to the optical path L in the left direction thereof, so that a portion of the light which has transmitted the negative film 12 and has been converged by the lens 34 is reflected horizontally to the right in FIG. 2. The half mirror 36 is oriented so as to prevent the enlarged image by the lens 34 from causing at least a so-called "mirror offset".

The exposure computing sensor 32 is disposed beneath the half mirror 36, namely, at a position where the sensor 32 is subjected to the light irradiated along the optical path L to receive the light which has transmitted the half mirror 36. The exposure computing sensor 32 has a CCD element (i.e., a charge coupled device) including pixels which are arranged in a matrix of 256×256, so that the intensity distribution of the light which has transmitted the negative film 12 is detected. The exposure computing sensor 32 also has a filter which is not shown and disposed on the side of the light source 22 in conformity to the characteristics in the negative film 12 and the printing papers.

The exposure computing sensor 32 is also connected to an exposure computing section 33 which computes the exposure amount of the image frame 12A on the basis of the intensity distribution of the light which has transmitted the negative film 12. The intensity distribution of the light has been detected by the sensor 32. The exposure computing section 33 is connected to a control section 74 which effects each of the controls which will be described later in the scanner 10, and to which the computed exposure amount is transmitted.

A video sensor 38 is disposed on the right of the half mirror 36 such that the light receiving surface of the video sensor 38 is inclined 45° with respect to the reflecting surface of the half mirror 36 and the video sensor 38 to be subjected to the light which has been reflected from the half mirror 36. The video sensor 38 has a CCD sensor including pixels, for example, in a matrix of 640×480, and electrically converts an image formed on the negative film 12 into a digital image. Further, the number of pixels, dimension or the like of the CCD sensor may be set such that the image range which is photographed by the video sensor 38 incorporates the whole range of the image frames 12A in the negative film 12 including numeral 17 thereinto at the time of the maximum field angle of the lens 34.

The video sensor 38 is also connected to an image processing section 39 which implements a digital image processing with respect to the image data which has been output therefrom. The image processing section 39 is connected to a CRT monitor 40 which displays the photographed image and to the control section 74 which gives instructions with respect to the image processing and inputs the image data to the CRT monitor 40 and the control section 74, respectively.

The CRT monitor 40 can directly display not only a portion or a whole range of the image which has been photographed by the video sensor 38 but also display the image which has been subjected to image processing at the image processing section 39.

The control section 74 is connected to a key board 41 through which the instructions with respect to the image processing and various types of data can be input by the operator to reflect the operator's intention on various controls in the scanner 10. Further, the control section 74 is connected to a storage section 75 which stores image data and database for an image management and also connected to various sensors which will be described later and are provided on the negative film carrier 48. Moreover, the control section 74 is also connected to driving means which will be described later and generates the driving force for transporting the negative film 12, so that transporting of the negative film 12 is controlled. Further, the storage section 75 can read and/or write data by accessing a storage medium. For example, a magnetic disk device, an optical magnetic disk device, a floppy disk device or the like is used as the storage section 75.

Next, with reference to FIGS. 2 and 4, a description of the negative film carrier 48 of the present invention will be given in detail, hereinafter.

An opening 50 is formed at the central portion of the negative film carrier 48 through which the optical path L of the light source section 20 (see FIG. 2) passes. When the optical path L passes through the negative carrier 48, the optical path L transmits the image frame 12A which has been positioned within the opening 50, and reaches to the sensor section 30 (see FIG. 2). Further, a transport path 56 is provided in the negative film carrier 48 and the image frame 12A is sequentially guided into the opening 50. Moreover, the width of the transport path 56 is equal to that of the negative film 12, so that a gap in the widthwise direction of the film 12 is prevented from being formed between the negative film 12 and the transport path 56 during the transport of the negative film 12.

A pair of reading heads 58 (i.e., 58A and 58B) are provided at the respective end portions of the transport path 56 in the transverse direction of the film 12, which end portions being closer to the upstream transport direction of the film 12 than the opening portion 50. Each of the reading heads 58 is slidably brought into contact with the respective magnetic tracks 16 (see FIG. 3) which are provided at the end portions of the negative film 12 in the transverse direction thereof to read the magnetic information which has been written into the magnetic tracks 16. One of the reading heads 58 reads print information which has been written into one of the magnetic tracks 16 of the image frame 12A and is supposed to be read at the time of reprint, while the other of the reading heads 58 reads camera information which has been written into the other of the magnetic tracks 16 of the image frame 12A.

When the image frame 12A which is subject to photometry is positioned within the opening 50, the reading heads 58 are disposed between two adjacent image frames 12A. Therefore, when the negative film 12 is transported intermittently from the feeding reel 44 to the take-up reel 46 (i.e., a forwarding transport of the negative film 12) for photometry, the reading heads 58 can read magnetic information for each image frame 12A as the image frame 12A for which photometry has been completed is transported one by one.

A writing head 60 is disposed at a substantially central portion of the transport path 56 of the negative carrier 48. The writing head 60 is provided at one end portion of the transport path 56 and is connected to the control section 74 (see FIG. 2). When the negative film 12 is transported at a fixed speed at the time of a returning transport (i.e., from the take-up reel 46 to the feeding reel 44), the writing head 60 contacts one of the magnetic tracks 16 of the image frame 12A of the negative film 12 to be slidable for writing the exposure correction data due to the photometry into the magnetic track 16. Therefore, the exposure correction data due to the photometry in the forwarding transport path of the film 12 is written into the writing head 60. At the time of reprint, the written data is read and reused by the reading head 58A which is provided at the same one end portion of the transport path 56, at which the writing head 60 is provided.

In the negative film carrier 48, a sensor section 64 which consists of a plurality of optical sensors 62 is provided closer to the upstream side of the transport path 56 in the transport direction of the negative film 12 than the reading heads 58 to specify a sheet of negative film by detecting splice portions of the negative film 12, to specify image frames 12A by detecting the perforations 14 formed in the negative film 12, and to dispose each image frame 12A properly within the opening 50. Further, some sensors 62 specify the negative film 12 by detecting the bar code 18 in the negative film 12, and detect the size of the image frame 12A and the first and last image frame of all the image frames by measuring the image density which is written into the image frame 12A. Meanwhile, other sensors 62 detect skipped image frames by determining whether an image is written into the image frame 12A.

The transport roller 52 is provided farther closer to the downstream side of the transport path 56 in the transport direction of the negative film 12 than the opening 50, and nips and transports the negative film 12 by the predetermined amount of transport in use with the pressing roller pair 54 facing the transport roller 52 with the film 12 being interposed therebetween. The transport roller 52 is connected to the control section 74 via the transport control section which is not shown. The negative film 12 is transported intermittently at the time of the forwarding transport of the film 12 to position the image frame 12A within the opening 50, while a sheet of the negative film 12 is transported at a fixed speed at the time of the returning transport of the film 12.

Thus, once the negative film 12 is provided, in the negative film carrier 48, the image frame 12A is positioned within the opening 50 by transporting the negative film 12 intermittently with the transport roller 52 at the time of the forwarding transport of the film and is subject to photometry by the light irradiated from the light source section 20. Further, various types of optical information about the other image frames are read by the optical sensor section 64 at the time of the intermittent transport of the film, while magnetic information is read by the reading heads 58. On the other hand, a roll of the negative film 12 which has been taken up by the take-up reel 46 is transported along the transport path 56 at a fixed speed at the time of the returning transport of the film, and contacts the writing head 60 slidably at a fixed speed to write the information obtained by the photometry into the magnetic track 16.

Further, a plurality of fixing rollers 66 and a plurality of reservoir rollers 68A and 68B are provided at the transport section 42 which transports the negative film 12 (note: fixing rollers 66 are partially omitted in FIG. 2 and positions of the respective rollers are schematically shown).

The reservoir rollers 68A and 68B are provided between the two fixing rollers 66, respectively (see FIG. 1) and are connected to a loading control section which is not shown. The reservoir rollers 68A and 68B may change their positions along a predetermined moving path in response to instructions given from the loading control section.

The reservoir roller 68A is placed between the feeding reel 44 and the negative film carrier 48 and forms a reservoir 70 by displacing the predetermined moving path from a position to the other and by protruding the negative film 12, so that the brake of the feeding reel 44 is controlled. Further, a magnitude of the reservoir 70 may be changed by moving the moving path by the amount in which the film 12 is fed from the feeding reel 44 and by the amount in which the film 12 is transported in the negative film carrier 48, and prevents excessive tensile force from being applied to the negative film 12.

On the other hand, the reservoir roller 68B is placed between the negative film carrier 48 and the take-up reel 46 and forms a reservoir 72 by displacing the predetermined moving path from a position to the other and by protruding the negative film 12, so that it is determined whether the take-up reel 46 is operable. Further, a magnitude of the reservoir 72 may be changed by moving the moving path by the amount in which the film 12 is fed from the negative film carrier 48 and by the amount in which the film 12 is taken up by the take-up reel 46, and prevents excessive tensile force from being applied to the negative film 12.

When these reservoir rollers 68 are fully auto-loaded, they are disposed at their initial positions on the predetermined moving path, which are displaced from the transport section 42 for transporting the negative film 12. At this point, the term, "auto-loading" means a predetermined constant rate transport of the film 12 from the time at which the negative film 12 is loaded onto the feeding reel 44 and fed into a feeding path 88 which will be described later, to the time at which the first image frame 12A of the first negative film 12 in the negative film carrier 48 is set in a photometric state.

A holding section 80 (see FIG. 1) is disposed between the reservoir 70 and the feeding reel 44 for feeding the negative film 12, which has been loaded onto the feeding reel 44, into the transport section 42.

A description of the holding section 80 will be given in detail hereinafter with reference to FIGS. 5 and 6.

Figure 5:
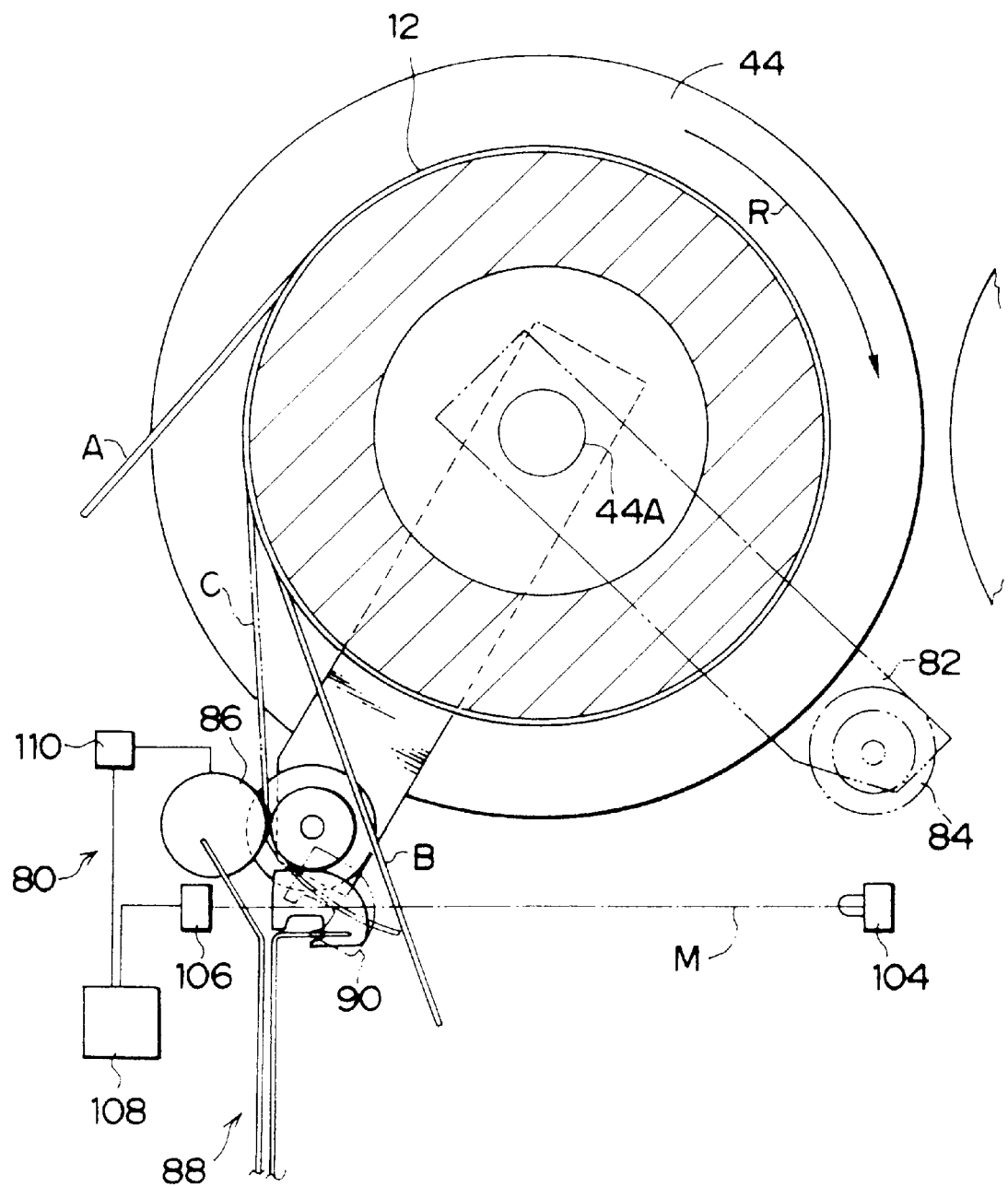
FIG. 5 is a schematic front view of a holding section according to the embodiment of the present invention.

As shown in FIG. 5, the holding section 80 has an arm 82 which is rotatable round the shaft 44A whose center point is centered, of the feeding reel 44. A holding roller 84 is provided at the tip end portion of the arm 82. In this way, the holding roller 84 moves along a predetermined moving path in communication with the movement of the arm 82.

Figure 6:
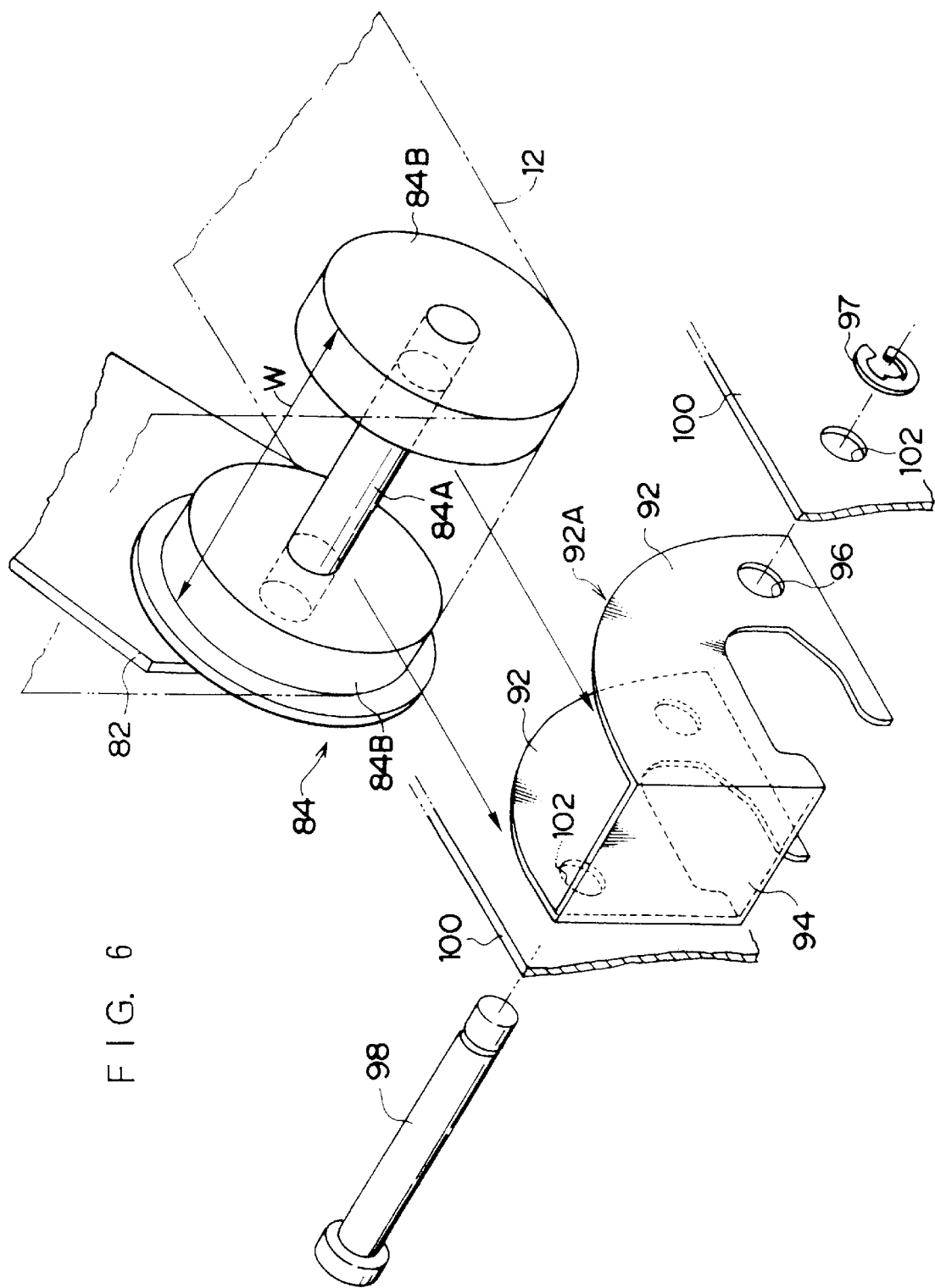
FIG. 6 is a exploded perspective view which illustrates a guide and a holding roller according to the embodiment of the present invention.

As shown in FIG. 6 (note: the arm 82 is omitted), the holding roller 84 consist of a shaft 84A and a pair of rollers 84B. The width of the holding roller 84 (i.e., size W in FIG. 6) is substantially equal to that of the negative film 12.

A driving roller 86 is provided in the vicinity of the feeding reel 44 on a portion extended from the moving path of the holding roller 84. When the holding roller 84 moves along the moving path (i.e., nipping position), the driving roller 86 is brought into contact with the holding roller 84. A driving control portion 110 is connected to the driving roller 86 and controls the transport amount and the transport direction of the driving roller 86. Therefore, the negative film 12 which has been pulled out of the feeding reel 44 is nipped by the holding roller 84 and the driving roller 86 and is transported in the direction in which the film is taken up by the feeding reel 44 (i.e., inverse transport) or the forwarding direction (i.e., forwarding transport) thereof.

An entrance portion of the feeding path 88 for feeding the negative film 12 into the transport section 42 (see FIG. 1) is provided adjacent to a position where the film 12 is nipped by the driving roller 86 and the holding roller 84. Accordingly, through the entrance portion of the feeding path 88, the negative film 12 which has been nipped by the driving roller 86 and the holding roller 84 is fed into the feeding path 88 and guided into the transport section 42.

A guide 90 which feeds the tip end portion of the negative film 12 into the feeding path 88 is provided between the holding roller 84 and the feeding path 88.

As shown in FIG. 6, the guide 90 includes a blocking surface 94 whose width is smaller than the length of the shaft 84A of the holding roller 84. The blocking surface 94 is sandwiched by a pair of side plates 92 which are provided at the end portions of the blocking surface 94 extending therefrom, so that the guide 90 is in a rectangular shape.

Sides 92A of side plates 92 are provided toward the holding roller 84. Each of the sides 92A forms a circular arc.

Accordingly, when the holding roller 84 abuts the sides 92A, the holding roller 84 can move along the sides 92A of the guide 90 without applying excessive loading to the sides 92A. Further, the guide has through holes 96 which are formed at the lower ends of the side plates 92 in FIG. 6. Through holes 102 of brackets 100 are formed on the sides of the guide 90. A shaft 98 is inserted into the through holes 102 as well as the through holes 96, so that the guide 90 is fixed to the brackets 100 and is rotatable round the through holes 96 whose center points are as support points. The shaft 98 which causes the guide 90 to be pivotal with respect to the brackets 100 is fastened by E-ring to prevent the shaft 98 from moving in the inserting direction thereof.

Testing light blocking may be effected or canceled by the blocking surface 94 of the guide 90 being inserted into or withdrawn from the optical axis M of the detecting light irradiated from a light source 104 which detects the tip end portion of the negative film 12 (see FIG. 5).

The guide 90 is set in a state in which the blocking surface 94 has been removed from the optical axis M of the light source 104 due to the urging force of a spring which is not shown. When a predetermined angle is formed with respect to the optical axis M and a certain distance is given between the blocking surface 94 and the entrance portion of the feeding path 88 which is disposed at the lower portion in FIG. 5, the blocking surface 94 in the removed state can be maintained. Therefore, when the tip end portion of the negative film 12 which has been fed from the feeding reel 44 contacts the blocking surface 94 which has been set in the removed state, the tip end portion of the film 12 is guided into the entrance portion of the feeding path 88.

When the holding roller 84 moves along the sides 92A of the guide 90 due to the movement of the arm 82, positions at which the guide 90 is held are changed by setting the center points of the through holes 96 thereof as support points. In this way, the blocking surface 94 of the guide 90 is inserted into the optical axis M irradiated from the light source 104 to block the detecting light.

The detecting light irradiated from the light source 104 is sensed by a photoreceptor 106 which is disposed upon the optical axis M. The photoreceptor 106 is connected to a holding control portion 108 which is also connected to the respective portions, which are not shown, of the feeding reel 44 and the arm 82, and a driving control portion 110 which drives the driving roller 86. Therefore, by sensing that blocking of the detecting light irradiated from the light source 104 has been effected or canceled, the holding control portion 108 is able to control driving of the feeding reel 44, movement of the arm 82, and driving of the driving roller 86.

Next, a feeding mechanism of the negative film 12 will be described in detail hereinafter with reference to FIGS. 5 and 7. By sensing blocking of the detecting light from the light source 104, the holding control portion 108 controls the holding of the tip end portion of the negative film 12.

Namely, as shown in FIG. 5, when the negative film 12 in a roll is loaded onto the feeding reel 44 and is rotated in the direction of an arrow 'R' (i.e., inverse direction), the negative film 12 is pulled out due to its own weight (the negative film 12 at the position of 'A' in FIG. 5), and the tip end portion of the negative film 12 is inserted into the optical axis M irradiated from the light source 104, so that the optical axis M is blocked (the negative film 12 at the position of 'B' in FIG. 5).

When the detecting light from the light source 104 is blocked by the tip end portion of the negative film 12, by sensing it through the photoreceptor 106, the holding control portion 108 moves the arm 82, so that the holding roller 84 is brought into contact with the negative film 12.

The negative film 12, which is kept in contact with the holding roller 84 due to the movement of the arm 82, moves close to the driving roller 86 together with the holding roller 84 due to the movement of the holding roller 84, contacts the guide 90 on the way of the moving path of the film 12, and the guide 90 is thereby moved. Thereafter, the negative film 12 is nipped by the driving roller 86 and the holding roller 84 (i.e., the negative film 12 at the position 'C' in FIG. 5).

Figure 7A:
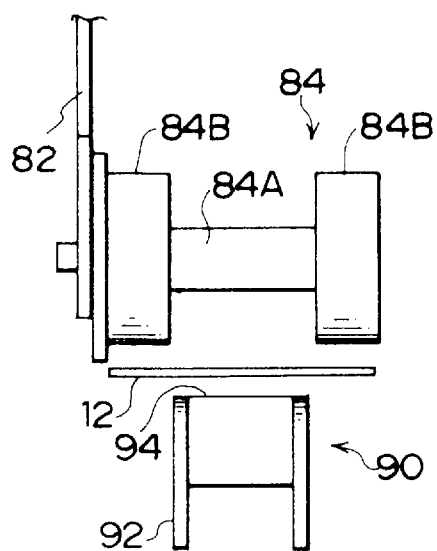
FIG. 7A is a cross-sectional view which illustrates the respective positions of the holding roller and the guide when the detected light is blocked.
Figure 7B:
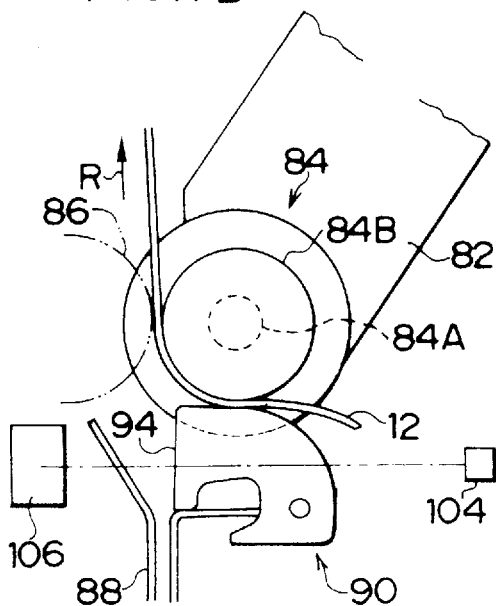
FIG. 7B is a side view which illustrates the respective positions of the holding roller and the guide when the detected light is blocked.

As shown FIG. 7A, the width of the blocking surface 94 of the guide 90 is smaller than that between the rollers 84B of the holding roller 84. At this point, since the negative film 12 is interposed between the guide 90 and the holding roller 84, the guide 90 is prevented from entering between the rollers 84B. Therefore, when the holding roller 84 contacts the guide 90 in a state in which the holding roller 84 is kept in contact with the negative film 12, the guide 90, the holding roller 84, and the negative film 12 are in contact with one another to be slidable, the guide 90 is moved to be rotatable round the through holes 96 whose central points are as support points, and the detecting light from the light source 104 is thereby blocked by the blocking surface 94 (see FIG. 7B).

Figure 7C:
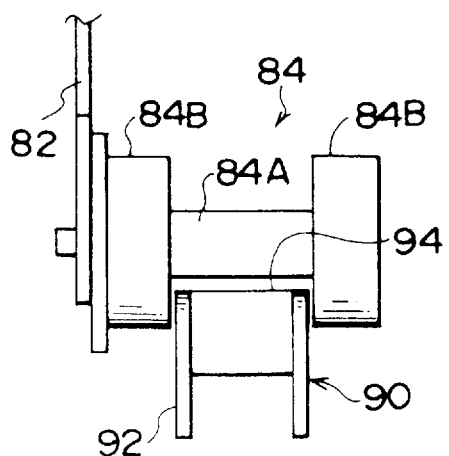
FIG. 7C is a cross-sectional view which illustrates the respective positions of the holding roller and the guide when blocking of the detected light is canceled.
Figure 7D:
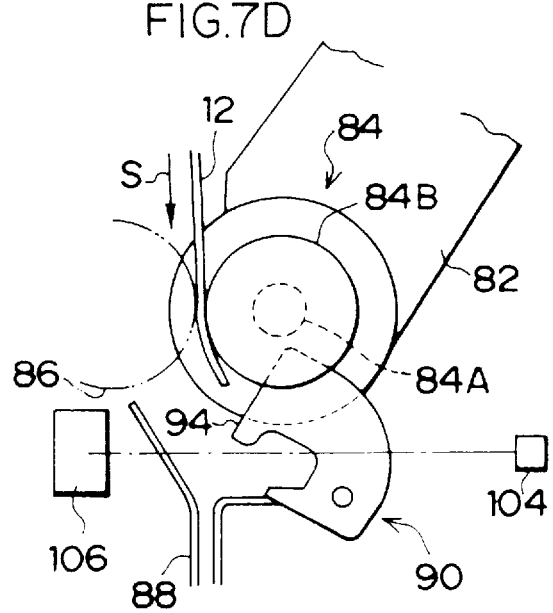
FIG. 7D is a side view which illustrates the respective positions of the holding roller and the guide when blocking of the test light is canceled.

On the other hand, as shown in FIG. 7C, when the negative film 12 is rewound (in the direction of an arrow 'R' in FIG. 7B) and the tip end portion of thereof passes through the guide 90, the guide 90, which has been prevented from entering between the holding rollers by the negative film 12 being interposed between the guide 90 and the holding roller 84, enters into the inner peripheral side of the holding roller 84 due to the urging force of the spring which is not shown. As a result, blocking of the detecting light from the light source 104 is canceled, and the detecting light is allowed to be incident upon the photoreceptor 106 (see FIG. 7D).

As shown in FIG. 5, the holding control portion 108 is connected to the photoreceptor 106, the driving control portion 110 and a moving control portion which is not shown. When the detecting light from the light source 104 has been blocked by the negative film 12, by sensing it, the holding control portion 108 approaches to the driving roller 86 and moves the arm 82 through the moving control portion which is not shown.

Moreover, after the detecting light has been blocked by the blocking surface 94 of the guide 90 due to the movement of the holding roller 84, the feeding reel 44 and the driving roller 86 are driven in the rewinding direction of the negative film 12, the tip end portion of the negative film 12 passes through the guide 90, and the guide 90 is moved to cancel blocking of the detecting light. By sensing it, the holding control portion 108 inversely rotates the driving direction of the driving roller 86 into the forwarding direction of the film 12.

Therefore, the negative film 12 in a roll, which is loaded onto the feeding reel 44, is pulled out due to its own weight when the feeding reel 44 is inversely rotated (i.e., rotation in the rewinding direction of the negative film 12). By sensing it, the holding control portion 108 gives instructions to the holding roller 84. Based on the instructions, the holding roller 84 can move and nip (or hold) the negative film 12 together with the driving roller 86. When the holding roller 84 nips the negative film 12 and contacts the guide 90 during the movement thereof, the position of the guide 90 is changed, so that the blocking surface 94 of the guide 90 is inserted into the optical axis M of the light source 104.

When the feeding reel 44 is inversely rotated, the negative film 12 is rewound around the feeding reel 44 and the tip end portion of the negative film 12 is passed through between the holding roller 84 and the guide 90. When the tip end portion of the film 12 passed through between the holding roller 84 and the guide 90, the guide 90, which has been prevented from entering into the holding rollers 84B by the negative film 12 being interposed between the holding roller 84 and the guide 90, can move in the vicinity of the shaft 84A due to the urging force of the spring, so that the blocking surface 94 is withdrawn from the optical axis M. When the withdrawal of the blocking surface 94 from the optical axis M is sensed by the holding control portion 108, a regular rotation is made by inversely rotating the feeding reel 44 and the tip end portion of the negative film 12 is forwarded to the feeding path 88. Therefore, the tip end portion of the feeding reel 44 is guided into the feeding path 88 by the blocking surface 94 of the guide 90 which has been moved in the vicinity of the shaft 84A.

Next, an operation of the present embodiment will be described in detail hereinafter.

The elongated and developed negative film 12 is loaded onto the feeding reel 44 which is provided at the end portion of the scanner 10, is guided into the transport section 42 according to the feeding steps which will be described later, and is passed through the transport path in an auto-loading mechanism.

When the negative film 12 is passed through the transport path, the reservoir rollers 68A and 68B are caused to move and form the reservoirs 70 and 72.

When auto-loading of the negative film 12 is done, the negative film 12 is set in a standby state, and the transport thereof is started, and the perforations 14 are detected which indicate the position of an image frame 12A by using the optical sensor section 64, the negative film 12 is intermittently transported by the transport roller (i.e., forwarding path) and magnetic information which is written into each of the magnetic tracks 16 which correspond to the image frame 12A is read by the reading head 58.

The image frame 12A in which magnetic information has been read is positioned within the opening 50 of the negative film carrier 48 and is subject to photometry. The photometry is effected by inputting the image on the image frame 12A which has been transmitted by the light source 22 into the exposure computing section 33 and the imaging process section 39, through the exposure computing sensor 32 and the video sensor 38. As a result, exposure correction value is computed in order to effect an exposure properly.

After the photometry has been completed for all the image frames 12A in a sheet of the negative film 12, the exposure correction value is determined based on the read magnetic information and the result of the photometry. After the exposure correction value has been determined for each of the films in a roll of the negative film 12, the negative film 12 is instructed to effect an inverse rotation in the transport direction thereof, is transported on the transport path 56 of the negative film carrier 48 at a constant rate (in the returning path), and the exposure correction value which corresponds to each of the image frames 12A is written into the magnetic head 16.

Figure 8:
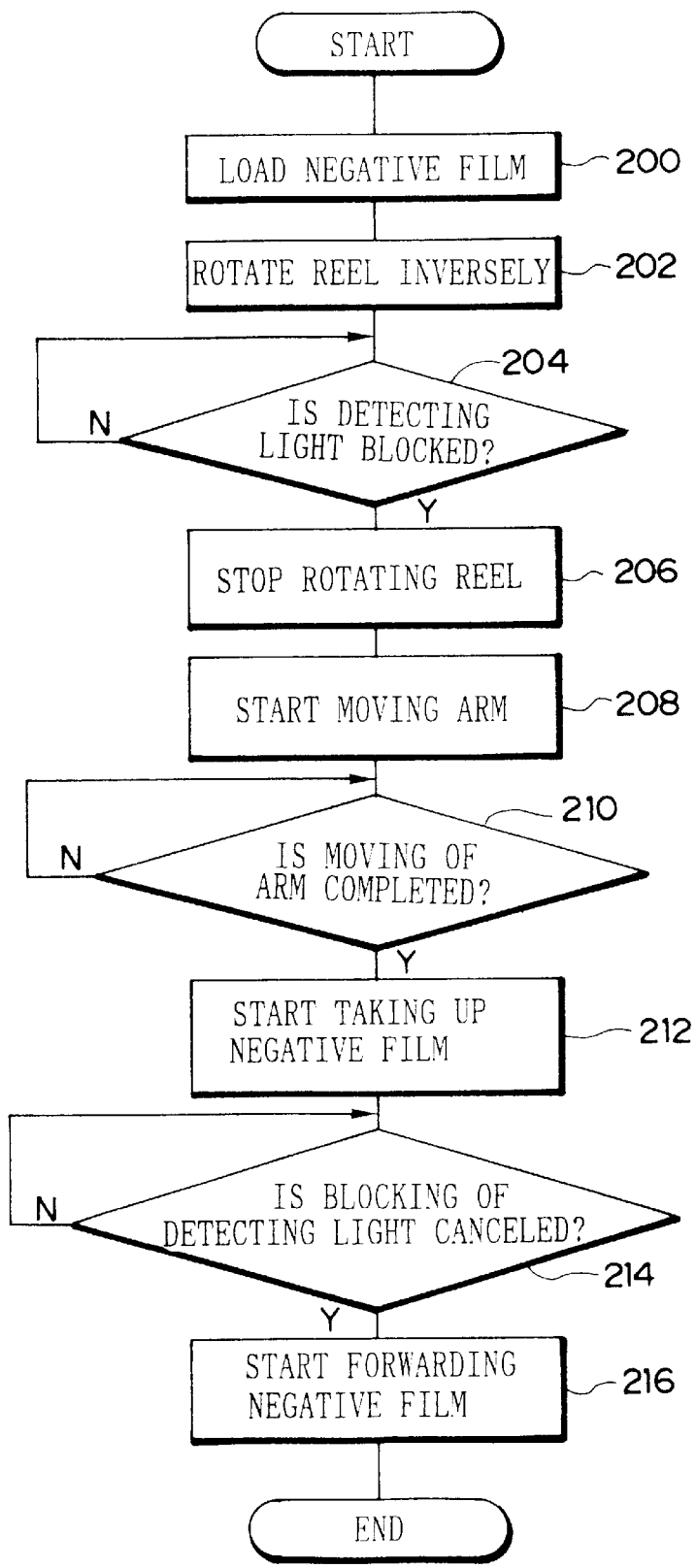
FIG. 8 is a flow chart which illustrates a feeding mechanism of a negative film according to the embodiment of the present invention.

Next, a feeding process will be described with reference to FIG. 8.

In Step 200, the negative film 12 in a roll is loaded onto the feeding reel 44, and in Step 202, the feeding reel 44 is started to rotate in the inverse rotating direction thereof (i.e., taking-up direction of the negative film 12).

After an inverse rotation of the feeding reel 44 has been effected in Step 202, in Step 204, a judgment is made whether the detecting light of the light source 104 has been blocked or not. If the negative film 12 is pulled out due to its own weight by the feeding reel 44 being rotated inversely, and the detecting light from the light source 104 is thereby blocked, the answer for the judgment is 'Yes' and proceeds to Step 206 in which the inverse rotation of the feeding reel 44 is stopped.

After the inverse rotation of the feeding reel 44 has been stopped in Step 206, in Step 208, the arm 82 is started to move along a predetermined moving path. When the arm 82 is started to move, a holding roller 84, which is provided at the distal end portion of the arm 82, contacts the negative film 12 during the movement thereof, moves along the moving path together with the negative film 12, and causes the position of the guide 90 to move, so that the blocking surface 94 of the guide 90 is inserted into the optical axis M of the detecting light.

After the arm 82 has been started to move in Step 208, in Step 210, a judgment is made whether the movement of the arm 82 has been completed by moving along a predetermined moving path. The answer for the judgment will be denied until the predetermined movement of the arm 82 is completed and the holding roller 84 which is provided at the distal end portion of the arm 82 is placed at the nipping and holding position where the negative film 12 is nipped and held by the driving roller 86 and the holding roller 84.

The answer for the judgment will be affirmed if the holding roller 84 is placed at the nipping and holding position where the negative film 12 is nipped and held by the driving roller 86 and the holding roller 84. In Step 212, the feeding reel 44 is instructed to rotate, and starts taking up the negative film 12 around the feeding reel 44.

After taking-up of the negative film 12 has been started in Step 212, in Step 214, a judgment is made whether blocking of the detecting light irradiated from the light source 104 is canceled. The answer for the judgment will be denied until the tip end portion of the negative film 12 which has been taken up by the feeding reel 44 and pulled out is rewound around the feeding reel 44 and passes through the guide 90, so that the guide 90 is moved, the blocking surface 94 of the guide 90 is withdrawn from the optical axis of the detecting light, and blocking of the detecting light is canceled.

Thereafter, in Step 216, the negative film 12 is started to be forwarded into the feeding path 88 by inverting the rotating direction of the feeding reel 44, and a series of the feeding processes are finished.

In this way, when the forwarding of the negative film 12 is started, the tip end portion of the negative film 12 contacts the blocking surface 94 of the guide 90 and is fed into the feeding path 88 and the negative film 12 is guided into the transport section 42. The negative film 12 which has been guided into the transport section 42 is set in a stand-by state due to the auto-loading, and is subjected to a predetermined photometric process.

Accordingly, after the negative film 12 in a roll has been loaded onto the feeding reel 44, the tip end portion of the negative film 12 is automatically and properly fed into the feeding path 88 and is transported along the transport section 42, the remaining photometric process is effected on the film 12, so that usability and processing capacity in the feeding mechanism can be improved.

Further, in a case of a negative film roll which should be replaced by another roll, the negative film 12 can be loaded onto the scanner 10 in full automatic system.

Next, a flow of a testing process of the negative film 12 in the scanner 10 will be described in detail hereinafter with reference to FIG. 9.

In Step 220, a negative film 12 is transported so as to locate the bar code 18 at a position in which the bar code 18 is read by each of the sensors 62. In next Step 222, a process is effected in which a sensor 62 reads the bar code 18.

Next, in Step 224, a judgment is made whether the bar code 18 is read in error. If there is no reading error, the answer for the judgment is 'No' and proceeds to Step 234 in which the image frame 12A is positioned to be photographed and immediately proceeds to Step 236.

If the bar code 18 is read in error in Step 224, the answer for the judgment is 'Yes' and proceeds to Step 226 in which the negative film 12 is transported to a position where the written numeral 17 can be photographed by the video sensor 38. In this transport, a predetermined distance from the first perforation 14 to numeral 17 after the splice has been detected is stored by the control section 74, a moving distance is determined based on the predetermined distance, and a transport system is controlled so that the negative film 12 is moved by the predetermined distance.

In next Step 228, the video sensor 38 photographs the image portion including at least all of numeral 17. In Step 230, CRT monitor 40 displays numeral 17 in Step 230.

In next Step 232, a judgment is made whether FID number is input by the operator through a keyboard 41. If FID number is not input, the answer is 'No', and waits for FID number to be input.

If FID number is input by the operator through the key board 41, the answer is 'Yes', and goes to Step 236.

In Step 236, the image frame 12A which has been set is photographed by the video sensor 38. In next Step 238, the photographed image frame 12A is displayed on CRT monitor 40.

In Step 240, the operator effects a testing on the negative film 12 by viewing the displayed image frame in order to detect the image frame numbers which need exposure amount correction because of excessive light intensity or the like and determine whether the exposure print of the image frame is proper or not. The testing result is input to the control section 74 by the operator through the key board 41. Further, when the operator corrected the image optimally by viewing the displayed image frame on CRT monitor 40, the exposure amount which is computed by the exposure computing section 33 and the correction amount which is specified by the operator through the keyboard 41 are transmitted to the control section 74 and may be used as a testing result.

In next Step 242, the testing result of Step 240 is stored into a database with respect to the negative film 12 which has been specified by the detected FID number. The database is formed by data files for each of the negative films 12. These data files are stored in the storage section 75 via the control section 74. Moreover, the data files consist of data formats similar to those which are shown in FIG. 10.

A data format is shown in FIG. 10A. The data format stores data management area which appears first in a data file and represents the management information about data length or the like, FID number of the negative film 12 which appears as the next data object in the data file, and then appears testing information 1, 2, . . . , 24 which represents testing results for each of the image frame numbers 1, 2, . . . 24. In an example which is shown in FIG. 10A, testing information has been stored for each frame having all image frame numbers. However, some image frames without problems in their exposure conditions or the like may not have testing results. Therefore, an example of a data format is shown in FIG. 10B which stores only testing information about the tested image frames. In FIG. 10B, a number of the image frames which have been tested is stored between FID number and testing information for each of the frames, so that a range from the first data to the last data in testing information is established in no time. With respect to the tested frames, they are stored in the data format so as to correspond the frame numbers to their testing information. Anyhow, in accordance with this example, the data format is structured such that FID number can equally correspond the negative film to its data file, and other structures for the data format may be changed optionally and preferably.

In Step 244, a judgment is made whether testing has been completed for all the image frames from the first frame to the last frame within the negative film 12. If the answer is 'Yes', the testing process effected on the negative film 12 is completed. If the answer is 'No', the testing process returns to Step 200 and repeats the same routine. The bar code 18 which represents FID number for each frame has been written in the negative film 12 which is applied to the testing process in FIG. 9. However, when a testing process is performed without cutting the same negative film 12 or by connecting all of the cut portions of the same negative film 12 to each other, the negative film 12 in which FID number is written only into the top portion thereof can be applied. The negative film 12 in which FID numbers are written for each cutting unit (including, for example, 6 image frames) can be used. In this way, in a case in which FID number is not written into each image frame, FID number reading process in FIG. 9 may be effected for each negative film unit or each cutting unit.

Figure 11:
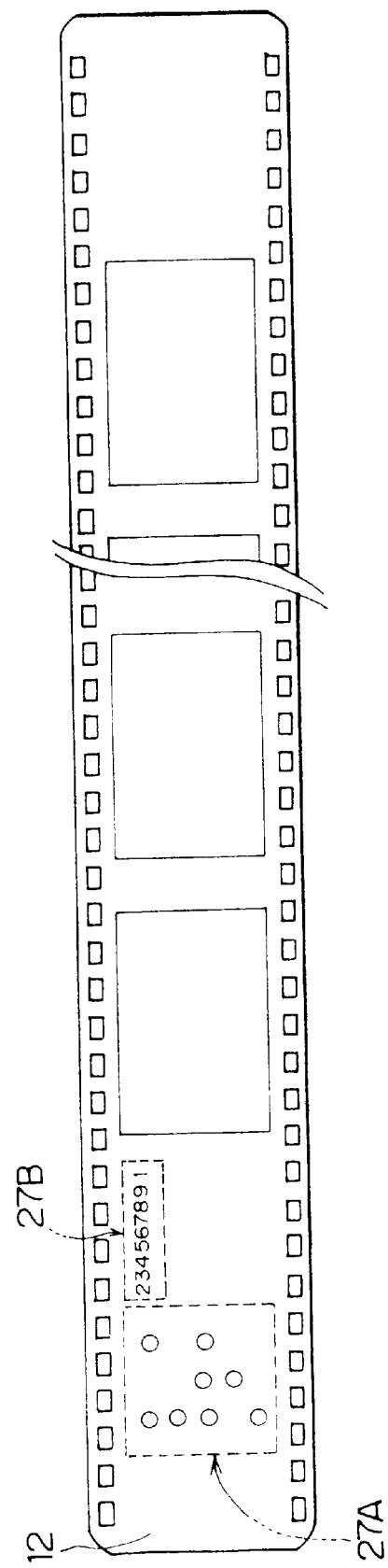
FIG. 11 is a view which illustrates an example of FID number which is written both in machine readable format and man readable format on a tip portion of the negative film.

An example of the negative film 12 in which FID number is written at the top thereof is shown in FIG. 11. As shown in FIG. 11, a plurality of holes 27A which are punched mechanically are arranged at the top portion of the negative film 12, so that FID number in machine readable format is represented due to the arrangement of the holes. Numeral 27B in man readable format is written adjacent to a plurality of the holes 27A. Certainly, when such a photographic negative film is used, a sensor 62 is not structured by a bar code reading device but structured by a sensor to optically read the plurality of the holes 27A. Further, the transporting system of the scanner 10 is structured such that a writing portion of numeral 27B into the negative film 12 is disposed directly below the opening 50.

Figure 9:
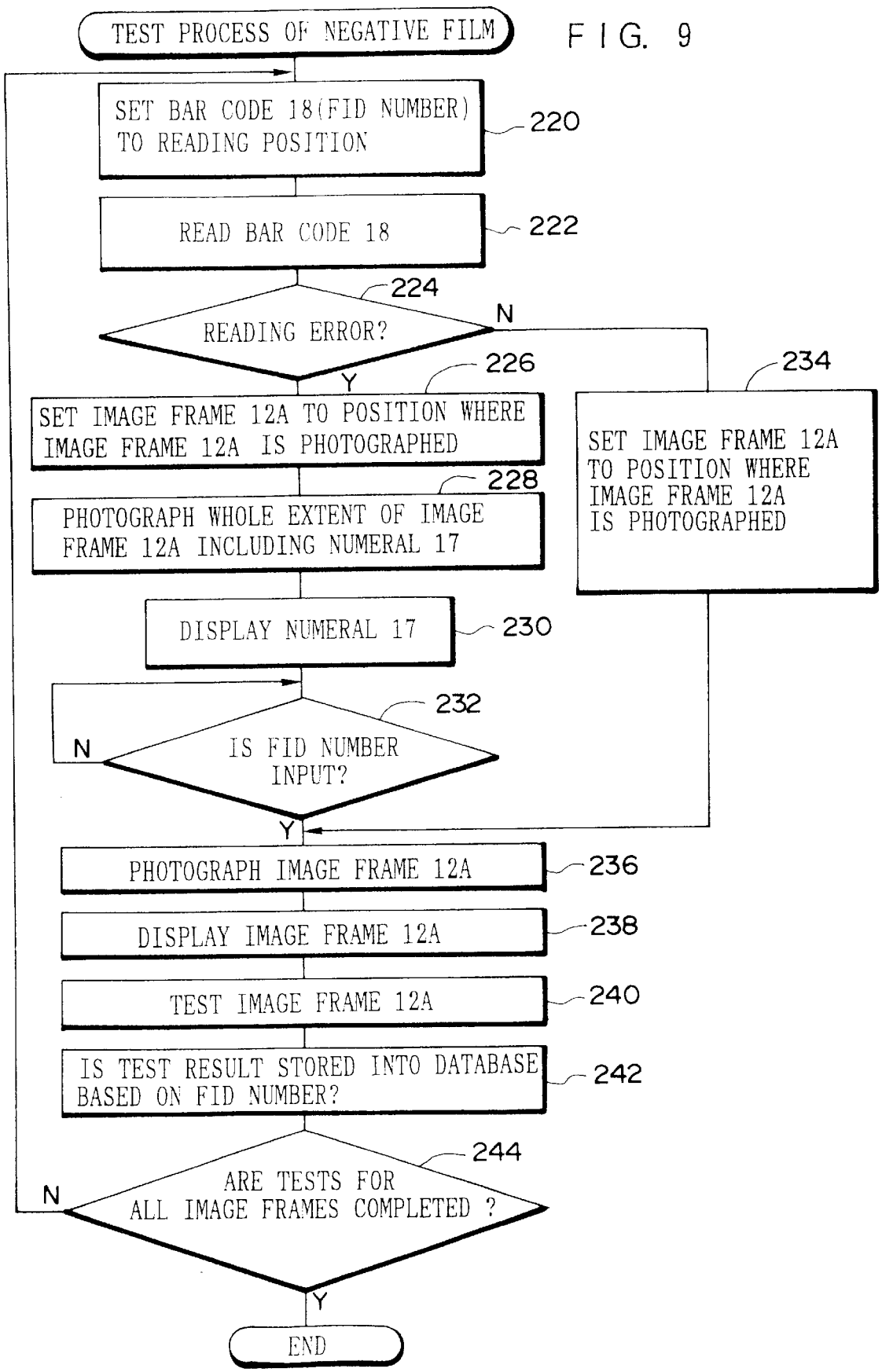
FIG. 9 is a flow chart which illustrates a testing process of the negative film according to the embodiment of the present invention.

Further, in the testing process in FIG. 9, when a reading error of the bar code 18 is occurred, numeral 17 is photographed by the video sensor 38 and displayed on the CRT monitor 40. However, only numeral 17 can directly be read independently of image photographing. Such an example is illustrated in FIG. 12. As shown in FIG. 12, an optical reading device 63 is disposed in the vicinity of numeral 17 which is written into the negative film 12. The optical reading device 63 is an apparatus which incorporates a so-called optical fiber optical system thereinto and guides the irradiated light from the inputting end portion 63A into the output end portion 63B. Moreover, the optical reading device 63 is provided such that the input end portion 63A is located directly above numeral 17 and the output end portion 63B is provided at a predetermined position which can visually be recognized by the operator. Therefore, the transmitted light or the reflected light of numeral 17 which has been incident upon the input end portion 63A is irradiated from the output end portion 63B, so that FID number can be recognized by the operator. In this way, by providing a device which directly reads FID number in man readable format, it becomes unnecessary to extend a range within which an image is photographed to a range including numeral 17 which is written outside of image frame 12A, so that the device may be minimized. Further, instead of the using an optical fiber system, a mirror optical system may be used by combining a plurality of mirrors and substantially the same effect as the optical fiber system may be obtained.

When the testing process which has been described in FIG. 9 is effected on a large number of the negative films, data files are formed for each negative film which has formats described in examples in FIG. 10A and 10B. However, since the negative film can immediately be specified by FID number, the testing results from the negative film are sorted appropriately, so that the printing process can be facilitated.

In a printing process, the printer processor which prints image frames in the negative film on a photographic printing paper effects the printing process by using a database having the testing results which are stored in the storage section 75.

When the printer processor is online with the scanner 10 to make a direct access to the storage section 75, and is provided with a sensor which is able to read FID number of the negative film 12 in the same way as the scanner 10 relating to the present embodiment, the following methods are available for implementing the printing process using FID number in which the printer processor reads FID number of the negative film, a data file having the FID number is detected from the storage section 75, and printing process is effected based on testing information about each image frame in the detected data file. Therefore, labors needed for effecting a process of applying the testing results of the negative film to the printing process is largely reduced. Moreover, even when the scanner is not online with the printer processor, in a case in which the printer processor has data readable storage means, the storage section 75 writes data files of the testing results into a storage medium such as a floppy desk, an optical magnetic disk or the like, and the data files in the storage medium is read by the storage means of the printer processor, so that the similar printing process can be effected.

Although preferred embodiments have been illustrated and described in which the present invention is applied to a scanner, it is to be understood that changes and variations may be made with respect to all the devices which implement a predetermined process based on the negative film which is specified by ID number. For example, even when ID number of the bar code 18 is read by the aforementioned printer processor, when ID number is read in error, processes in Step 226 to 232 in FIG. 9 may be repeated.

Further, while a negative film having perforations has been described in the present embodiment, the negative film of the present invention is not limited thereto and a so-called 135 negative film in prior art may be used. Writing/reading of a magnetic information which has been described in the present embodiment is not essential, it is desirable to provide any method to read/write ID number of the negative film.

The specific testing contents which have been described in the present embodiment may be modified optionally and desirably.

In addition, the present invention can be applied to a photographic film such as a black & white film or the like in addition to the negative film 12 of the present embodiment, and a mouse, a tablet, an acoustic recognizor or the like may be used as inputting means in addition to the key board 41 of the present embodiment.

What is claimed is:

1. A photographic film comprising means for discriminating one photographic film from another, wherein said means for discriminating comprises an ID number written into a tip end portion, or into each image frame, or into each cutting unit at the time of development of said photographic film, in man readable format which can be recognized by an operator and in machine readable format which can be recognized by a machine.

2. A method of specifying a photographic film having written thereon an ID number for discriminating one photographic film from another, the ID number being written in machine readable format and man readable format, comprising:

viewing the ID number written in man readable format when the ID number written in machine readable format cannot be read;

inputting the ID number written in man readable format to an inputting device; and specifying a photographic film in accordance with the ID number input to the inputting device.

3. A method of testing a photographic film by viewing respective image frames of the photographic film, the photographic film having written thereon an ID number for discriminating one photographic film from another, the ID number being written in machine readable format and man readable format, comprising:

reading the ID number written in machine readable format;

specifying a photographic film to be tested based on the ID number read in said reading step;

viewing the ID number written in man readable format when the ID number written in machine readable format cannot be read;

inputting the ID number viewed in said viewing step to an inputting device; and specifying a photographic film to be tested in accordance with the ID number input to the inputting device.

4. A system for discriminating a plurality of different photographic films from each other, comprising:

a plurality of different photographic films each having a means for discriminating one photographic film from another, said means for discriminating comprising an ID number written in machine readable format and man readable format;

means for reading the ID number written in machine readable format; and means for viewing the ID number written in man readable format when the ID number written in machine readable format cannot be read by said means for reading.

5. The system recited in claim 4, wherein said means for viewing comprises a video sensor and a monitor.

6. The system recited in claim 4, wherein said means for viewing comprises an optical fiber.

7. The system recited in claim 4, wherein the ID number written in machine readable format is a bar code.

8. The system recited in claim 4, wherein the ID number written in machine readable format is a plurality of holes punched in each of said photographic films.

* * * * *